March 21, 1944. J. F. McNUTT ET AL 2,344,711
WALNUT CUTTING MACHINE
Filed Feb. 3, 1943 2 Sheets-Sheet 1

JOHN F. McNUTT,
RALPH E. COLBY,
INVENTORS

BY
ATTORNEY.

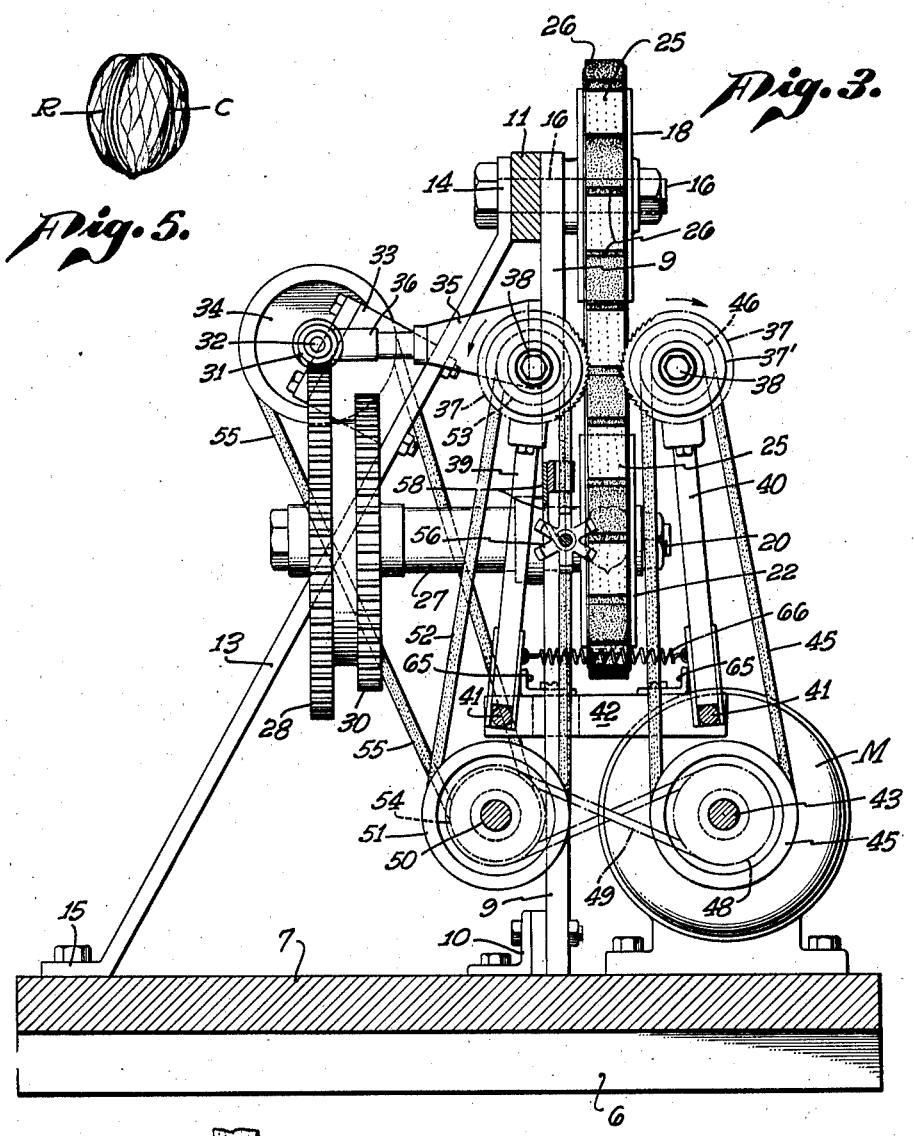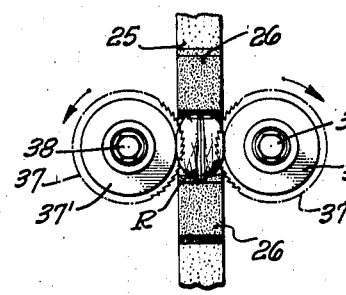

Patented Mar. 21, 1944

2,344,711

UNITED STATES PATENT OFFICE 2,344,711

WALNUT CUTTING MACHINE

John F. McNutt, Glendale, and Ralph E. Colby, Los Angeles, Calif.

Application February 3, 1943, Serial No. 474,508

6 Claims. (Cl. 146—10)

This invention relates to walnut cutting machines, and more particularly to improvements in the means for receiving, holding and carrying walnuts between opposed cutting saws for cutting through the shells at opposite sides thereof; to provide and so position the cutting saws at opposite sides of the path of movement of the walnuts that they will cut through the opposite sides of the walnut shells except at the top and bottom, thus leaving connecting portions at opposite ends of the shell to be broken in order to separate the shell into halves; to provide in such a machine two pairs of saws at opposite sides of the walnut being cut, the saws of each pair having a thin disc therebetween and two discs on the outer opposite sides thereof, said discs operating on the walnut shell to prevent the saws cutting too deep into the walnuts and injuring the meats therein; to provide means for automatically entering the cuts made in the shell for separating the parts of the shell as they are discharged from the machine; to provide means for automatically and yieldingly pressing against the opposite sides of the carrying belts, to more firmly hold the walnuts as they are carried to and between the saws; and, in general, to provide a walnut cutting machine which will cut into the opposite sides of a walnut without cutting clear through the shell at the opposite ends, and without cutting or injuring the meats therein, with means for automatically breaking the two halves of the shell and the meats therein apart as they are discharged from the machine.

In order to fully describe our invention, we have shown on the accompanying two sheets of drawings one practical embodiment thereof.

Figure 3 is a vertical sectional view taken on the line 3—3 on Fig. 1 with parts broken out and omitted to give view to other parts;

Figure 4 is a view of the saws, with a walnut passing therebetween, with one of the carrier members omitted; and Figure 5 is a perspective view of a walnut showing the saw cut.

Figure 1:
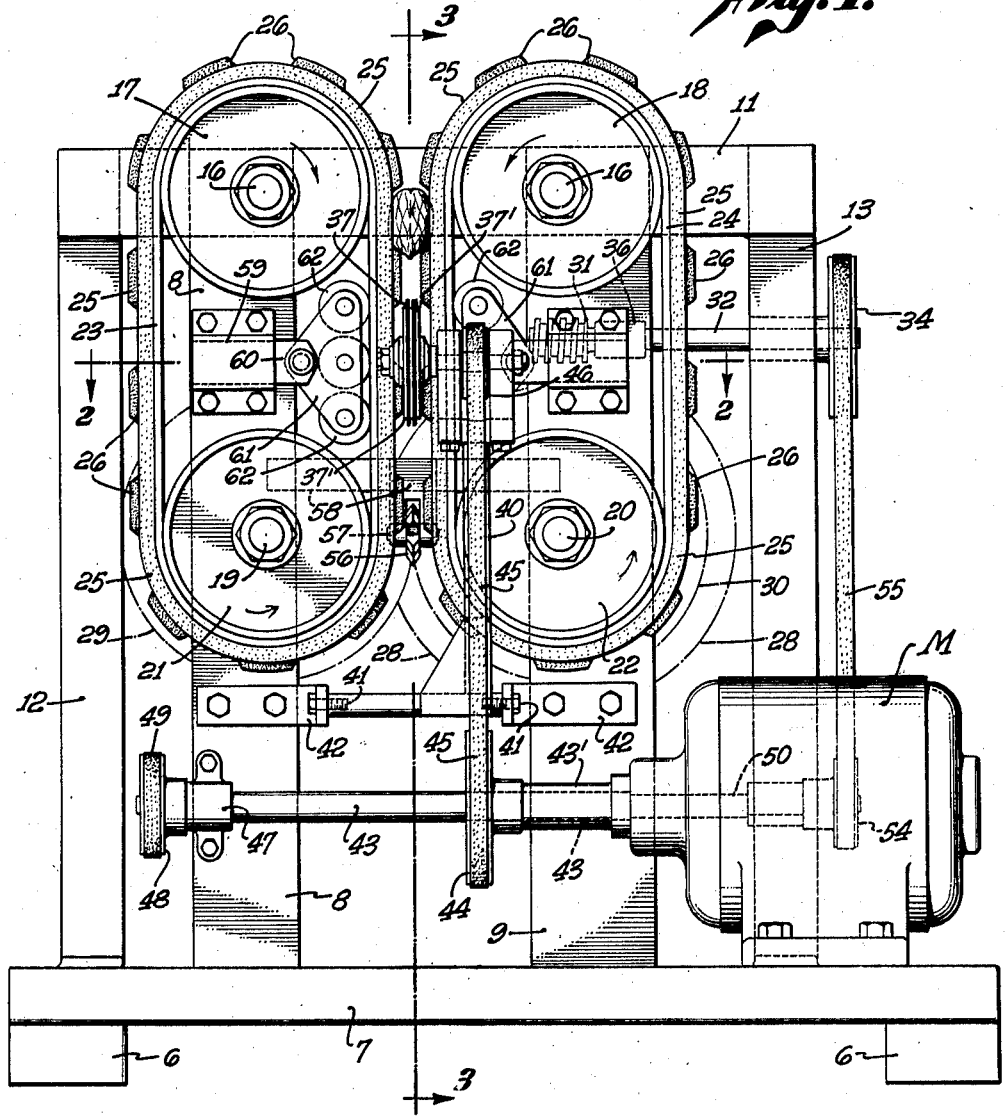
Figure 1 is a side elevation of a machine embodying our invention.

Referring now more in detail to the drawings, we will describe the machine here shown and embodying our invention. Any suitable base or support can be used. We show two spaced members 6, 6, with a platform 7 thereon upon which the machine is mounted.

Two vertical supporting members 8 and 9 are secured at their lower ends to said platform, as at 10, and at their upper ends they are connected by a cross member 11. This vertical frame is braced by means of two brace members 12 and 13, connected to the top, as at 14, and at the platform, as at 15.

Figure 2:
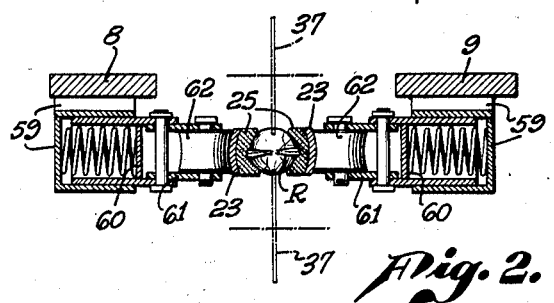
Figure 2 is a cross sectional view taken on the line 2—2 on Fig. 1 and showing the mechanism for yieldingly pressing against the opposite sides of the carrier members which carry the walnuts to and between the saws.

Two bearing members 16, 16, are provided through the upper connecting member 11, on which are mounted two pulleys 17, 18, as seen in Figs. 1 and 2.

Two other bearing members 19 and 20, are provided intermediate the top and bottom of said vertical members 8 and 9, and on these bearing members are two other pulleys 21 and 22. Two endless belts 23 and 24 run over these four pulleys, as shown, the belt 23 runs over pulleys 17 and 21, and belt 24 runs over pulleys 18 and 22.

These belts 23 and 24 are provided on their outer faces with felt facings, as 25, cemented or otherwise secured thereto, whereby the nuts can be slightly embedded therein as said belts are pressed inwardly, as hereinafter referred to. On these felt facings are also secured spaced felt lugs, as 26, to separate and hold the nuts therebetween, as clearly shown on Fig. 1.

The walnuts are fed by hand between the felt facings 25, 25, and between the felt lugs 26, 26, which form a carrying pocket for holding the walnuts in positions to be sawed. The natural ridges on the walnuts are positioned next to these felt facings 25, and sink thereinto slightly, thus helping to hold the walnuts in position to properly engage the saws. The cutting of the walnut is in a plane at right angles to the plane of the natural ridges usually found on walnuts, as will be understood from Fig. 5, in which the natural ridge is indicated as R, and the cut is indicated C.

A bearing sleeve 27 is shown, Fig. 3, for the bearing member 20, and on which the pulley 22 is mounted. This bearing sleeve at one end is anchored to the vertical supporting member 9, and at its other end supports two gears 28 and 29, mounted on the bearing member 20, above referred to. A similar bearing sleeve is associated with the bearing member 19, which carries the other pulley 21, and on the outer end of said shaft 19 is a gear 30, corresponding to and in mesh with the gear 29, whereby said gears 29 and 30, in mesh, and the pulleys 21 and 22, are all driven together in the direction indicated by the arrows on said pulleys 21 and 22, Fig. 1.

Said larger gear 28 is a worm gear and is driven by a worm 31, on a shaft 32, having one bearing in a member 33, mounted on the brace member 13. On the other end of said shaft 32 is a pulley 34. The worm end of said shaft 32 is supported by a bracket, as 35, extended from the vertical member 9, and having a connecting bearing at 36, near the worm 31.

Two pairs of saws are shown, designated 37, 37. These are mounted on suitable shafts, as 38, 38, through the bifurcated upper ends of two vertical supporting arms, 39 and 40, pivotally supported, as at 41, 41, in a supporting member 42, secured to the vertical supporting member 9. These two supporting arms 39 and 40 are seen in Fig. 3. In Fig. 1 only the arm 40 is seen, the arm 39 being at the opposite side of the mechanism seen in Fig. 1.

Each pair of saws, designated 37, has a thin disc therebetween and two corresponding discs on the outer opposite sides thereof, as at 37'. These discs ride on the shell of the walnut and prevent the saws from entering too far into the shell and thus damaging the meats therein. It will be understood that these saws are driven in a direction to cut upwardly as the walnut is moved downwardly therebetween, and inasmuch as the saw supporting arms are pivotally and yieldingly supported, said saws move outwardly and around the contour of the walnut, from the lower side to the upper side, the edges of the discs 37' riding on the shell and preventing the saws from cutting deeper than the thickness of the shell. The cuts thus made do not extend across the ends of the walnut shell, but leave connecting portions to be broken as the halves of the shell are broken apart.

Mounted on the platform 7 is a motor M having a drive shaft 43, provided intermediate its ends with a pulley 44, next to a bearing sleeve 43', on said shaft 43, with a belt 45 running therefrom to a pulley 46, on the upper end of the pivoted arm 40, for driving one pair of the saws 37. Said shaft 43, as seen in Fig. 1, is extended to a bearing bracket 47, and on the outermost end of said shaft is a pulley 48, from which runs a belt 49, to another pulley, not shown, on a shaft 50, at the opposite side of the machine and seen in Fig. 3.

From shaft 50, and a pulley 51 thereon, corresponding to the pulley 44, runs a belt 52, to pulley 53 on the shaft 38 of the other pair of saws, as seen in Fig. 3.

Also mounted on said shaft 50 is a pulley 54, to which runs a belt 55 from the pulley 34 on the worm shaft 32, above, as seen in Fig. 3.

Thus from the motor M both pairs of saws are driven on the upper ends of the two pivoted arms in unison and they are movable to and from the carrying belts for engaging and cutting walnuts being carried between said belts downwardly, as shown. From said shaft 50, and the belt 55, over the pulley 34, said worm 31 is driven for driving the worm gear 28, which in turn drives the gear 30, in mesh with a corresponding gear 29, and through which gears the feed belts are driven for receiving, holding and carrying the walnuts downwardly between said saws in the manner shown and described.

In a position below the saws, is mounted a six-fingered element 56, rotatably supported on a short shaft 57, held in a suitable bracket 58, said element being positioned so that as the cut walnuts are carried downwardly thereto, one of the fingers will enter the cut, and being of wedge shape, will break the two parts of the walnut shell apart just preceding its discharge from the carrying belts, as will be understood from the showing in Figs. 1 and 3.

Means are also provided for yieldingly pressing against the opposite, outer sides of the carrying belts at the sawing position for more firmly holding the walnuts during the sawing operation. For this purpose, supporting brackets, as 59, 59, are provided, in which spring-pressed plungers 60, 60, are mounted, on the outer ends of which are pivotally supported roller-carrying members 61, 61, in each of which are shown three pressure rollers, as 62, 62, said rollers having concaved faces as shown more clearly in Fig. 2.

Thus the walnuts are more firmly held between the felt faces on the carrying belts by the pressure mechanisms at opposite sides thereof, each mechanism having three pressure rollers, 62, 62, 62, for this purpose.

The saw-supporting arms 39 and 40, which are pivotally supported at their lower ends, as at 41, 41, as they are moved inwardly or toward each other and to the walnuts, have limit stops, as 65, to prevent them from moving inwardly too far and coming into engagement with each other. These stops can be secured in any suitable and convenient position.

It is also necessary to provide spring means for yieldingly and normally moving said saw-supporting arms inwardly toward the work, and for this purpose we have indicated a spring, as 66, for this purpose. It will be understood, of course, that suitable spring means can be provided and connected in the most suitable and practical positions, the drawings here being somewhat complicated for the best showing of this detail. As before described, as the walnuts are carried downwardly between the adjacent laps of the carrying belts, and the saws engage first the lower end of each walnut, the discs at the opposite outer sides of the saws ride on the shell and thus move the saws with the contour of said shells as the walnut is carried downwardly.

We are aware that changes in many details of construction and arrangement can be made without departing from the spirit of our invention, and we do not, therefore, limit our invention to these details, except as we may be limited by the hereto appended claims forming a part of this specification.

We claim:

1. A walnut cutting machine including two endless belts mounted to run with two laps thereof adjacent each other, said belts having flexible facings thereon to move together adjacent each other to receive walnuts therebetween, means for driving said belts, means at opposite sides for yieldingly pressing said belts together at the walnut position for holding a walnut firmly therebetween, two yieldingly mounted saws, in the same plane and at opposite sides of the walnut position, and movable to the walnut carried in said belts for cutting into the opposite sides thereof, means preventing said saws cutting across the opposite ends of a walnut, whereby to leave connecting portions of the shell at the opposite ends, and means for entering the cuts made for breaking the shell in two portions as it moves away from the saws.

2. In a walnut cutting machine, two endless belts of flexible material mounted to run with two laps thereof adjacent each other and moving in the same direction to receive and hold walnuts therebetween, to be carried therewith, spaced means along the adjacent faces of said belts to prevent walnuts being moved lengthwise of said belts, cutting saws mounted on opposite sides of said carrying belts, in the same plane, and movable to and from walnuts held between said belts, means for driving said saws, and means at the sawing position for pressing inwardly against the belts at the walnut position for firmly holding the walnut during the sawing thereof.

3. In a walnut cutting machine, two endless belts mounted to be driven with two laps thereof adjacent each other, flexible facings on said belts to receive walnuts therebetween with their natural ridges embedded in said flexible faces, means on said flexible faces to prevent movement of walnuts lengthwise thereof, and two opposed saws, in the same plane, at opposite sides of said belts, with means for driving them, for sawing into opposite sides of a walnut held in place between said belts.

4. In a walnut cutting machine, two endless belts mounted to be driven with two laps thereof adjacent each other, flexible facings on said belts to receive walnuts therebetween with their natural ridges embedded in said flexible faces, means on said flexible faces to prevent movement of walnuts lengthwise thereof, two opposed saws, in the same plane, at opposite sides of said belts, and movable to and from a walnut held between said belts, means for driving said saws, pressure means at opposite sides of said belts, at the sawing position, for pressing said belts more firmly together on to said walnut for holding it firmly during the sawing operation, and means for automatically entering the cuts made by said saws for breaking said shell portions apart after they pass the saws.

5. In a walnut cutting machine of the character shown and described, two endless belts having soft flexible faces positioned to receive and hold therebetween walnuts to be cut, means at opposite sides of said belts for pressing against them at the walnut position to more firmly hold said walnut, two movably mounted saws at opposite sides of the path of movement of said belts, with means for driving them, said saws being mounted upon the free movable ends of two supporting arms pivotally supported at their other ends, and means for moving said saws against the opposite sides of a walnut held between said belts for cutting into the opposite sides of the walnut as it moves therebetween, and means for breaking the parts of the walnut shell apart at the opposite ends as the walnut moves away from between said saws.

6. In a walnut cutting machine, two saws operatively mounted in the upper ends of two pivoted arms, in the same plane, and spaced apart, means for driving said saws, means yieldingly moving said arms and said saws toward each other, means for holding and carrying walnuts downwardly between said saws, said means including two endless belts having soft, flexible faces, to hold walnuts therebetween with their ridges embedded in said faces, and means for pressing against said belts at the walnut position during the cutting operation, and means for automatically breaking the cut shell of the walnut apart after it leaves the saws.

JOHN F. McNUTT.
RALPH E. COLBY.